UNITED STATES PATENT OFFICE.

CARL RUMPFF, OF APRATH, NEAR ELBERFELD, GERMANY.

MANUFACTURE OF BROWN DYE-STUFF.

SPECIFICATION forming part of Letters Patent No. 261,767, dated July 25, 1882.

Application filed May 16, 1882. (Specimens.)

*To all whom it may concern:*

Be it known that I, CARL RUMPFF, residing at Aprath, near Elberfeld, in the Kingdom of Prussia and Empire of Germany, have invented a new and useful Improvement in the Manufacture of Dye-Stuff or Coloring-Matter, of which the following is a specification.

This invention relates to a brown dye-stuff or coloring-matter which is produced by the action of diazoazotoluolsulphonate of soda upon naphthylamine in acid solution.

In carrying out my invention I take fifty pounds of amidoazotoluolsulphonate of soda dissolved in five hundred pounds of water cooled down to 3° centigrade. To this solution I add slowly seventy-five pounds of muriatic acid, and thereafter eleven pounds of sodium nitrite dissolved in forty pounds of water. After several hours' rest the liquid is poured into a solution containing twenty-five pounds of naphthylamine, fifty pounds of muriatic acid, and five hundred pounds of water. The new brown dye-stuff separates instantly as a voluminous precipitate, which is filtered and dried.

My dye-stuff, when dry, appears as a dark-brown powder. It is soluble in hot water, and its aqueous solution takes a brown color by the addition of alkaline. Muriatic acid or sulphuric acid dyes the aqueous solution bluish red. It dyes wool and silk in a dark reddish-brown color in an acidulated bath, and this color is fast against soap and light.

What I claim as new, and desire to secure by Letters Patent, is—

1. The product described, consisting of a new brown dye-stuff or coloring-matter which is produced by the action of diazoazotoluolsulphonate of soda upon naphthylamine in acid solution.

2. The mode of preparing the within-described dyestuff, the same consisting in adding to a solution of amidoazotoluolsulphonate of soda, first, muriatic acid, then a solution of sodium nitrite, and then an acid solution of naphthylamine, substantially as set forth.

CARL RUMPFF.

Witnesses:
ANTHONY GREF, Jr.,
WM. A. POLLOCK.